May 14, 1929.   J. H. DUNCAN   1,712,693
CERTIFICATE HOLDER
Filed Oct. 18, 1927
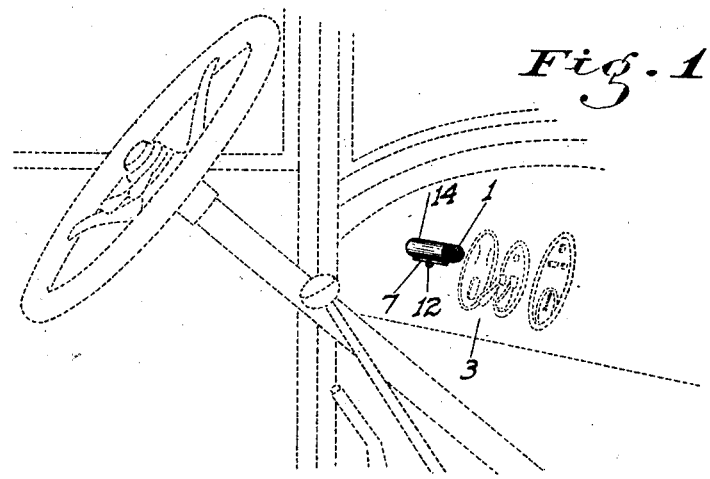
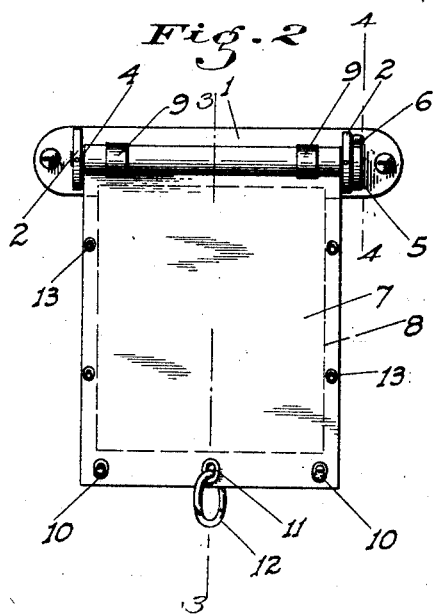
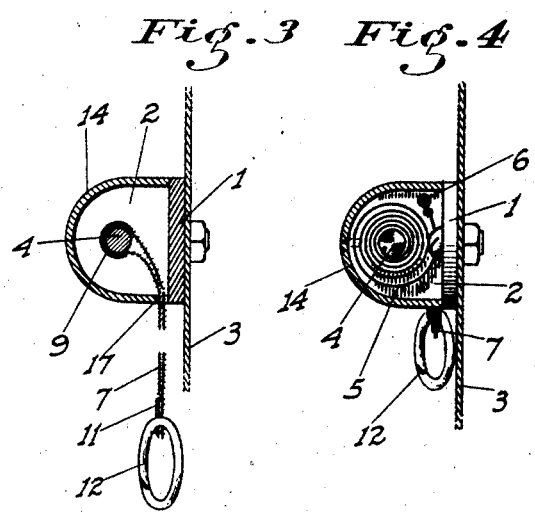
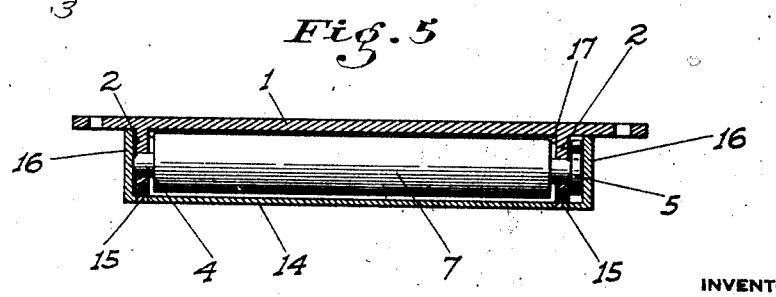
INVENTOR
J. H. Duncan
BY 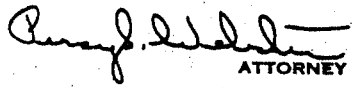
ATTORNEY Patented May 14, 1929.

1,712,693

UNITED STATES PATENT OFFICE.

JOHN H. DUNCAN, OF SACRAMENTO, CALIFORNIA, ASSIGNOR OF ONE-HALF TO THOMAS A. STACKHOUSE, OF SACRAMENTO, CALIFORNIA.

CERTIFICATE HOLDER.

Application filed October 18, 1927. Serial No. 226,850.

This invention relates to improvements in devices for holding automobile registration certificates, which as is well known are issued yearly and are intended to be permanently kept in the car in some place where they may be readily inspected by traffic officers and other authorities. There are various ways at present in use for mounting these certificates, usually by means of celluloid covered frames which are either rigid and are adapted to be attached to the footboard or engine bulkhead of the car in front of the dashboard; or of a flexible nature such as may be wrapped about the steering column of the vehicle. Neither method makes for ease and convenience of reading of the certificate, and before it is time to replace any certificate it has frequently become covered with dirt owing to the tearing of the celluloid cover, or the cover itself has been rendered more or less opaque by coming in contact with the feet of the occupants of the front seat of the car, rendering the certificate sometimes illegible.

The principal object of my invention therefore is to provide a holder for a certificate of this nature constructed so that it may be mounted directly on the dashboard without occupying much space, thus making the certificate more readily accessible for inspection or replacement; and so that the certificate while normally concealed and kept in a clean condition at all times may be instantly moved into a position for convenient inspection or removal from the holder when desired.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a fragmentary perspective outline of the driver's compartment of a motor vehicle showing my improved certificate holder mounted thereon.

Fig. 2 is a front elevation of the device with the cover removed and with the certificate holding envelope unrolled or outstretched.

Fig. 3 is a cross section of the holder on the line 3—3 of Fig. 2.

Fig. 4 is a similar view on the line 4—4 of Fig. 2.

Fig. 5 is a longitudinal sectional plan of the device with the certificate envelope rolled up.

Referring now more particularly to the characters of reference on the drawings the supporting frame of the holder comprises a narrow relatively long back plate 1 having a pair of longitudinally spaced lugs or ears 2 projecting outwardly from its front face, the plate beyond the ears being orificed to receive screws whereby it may be attached to the dashboard 3 of a motor vehicle either in the position shown or in any other location suitable or desirable. Turnably mounted in the lugs 2 is a spindle 4, to one end of which outwardly of the adjacent lug is fixed one end of a spiral spring 5, the other end of which is removably attached to said lug by a screw 6. This spindle is intended to be placed by slipping the same endwise through the lugs before the screw 6 is attached, and is then held against longitudinal movement by the cover hereinafter described.

Doubled on itself about the spindle between the lugs is a sheet of transparent fabric of suitable character forming an envelope 7, whose area is sufficient to receive an ordinary license certificate card 8 without folding the same. This envelope is held from slipping about the spindle by spring clips 9 or by any other securing or fastening means which may be found suitable for the purpose. The two thicknesses of the envelope along the outer end edges thereof are detachably connected together by suitable catches such as snap fasteners 10 of that type which are commonly used on gloves and the like. Intermediate the fasteners separate rings 11 are attached to the fabric thicknesses, through which rings pass a relatively large and split handle ring 12. Permanent connection means as indicated at 13 fasten the envelope thicknesses together at intervals along the sides thereof. The snap fasteners 10 and the connection means 13 are arranged so as to provide for longitudinal play between the thicknesses of the envelope as is necessary when said thicknesses are rolled about each other onto the spindle; since otherwise either the inner thickness will become wrinkled with such rolling, or the outer thickness will be stretched and possibly torn. The spring 5 is disposed so as to exert a pressure to turn the spindle so that the envelope will be rolled up thereon.

A hood or cover 14 is arranged to be removably placed over the spindle and the rolled up envelope, being held in place by screws 15 engaging the ears or lugs 2. The cover has end members 16 formed therewith, one of which is disposed just beyond one of the ears and the other is disposed beyond the other ear a sufficient distance to enclose the spring 5. On top the cover makes a close contact with the back plate 1 but along the bottom it is provided with a longitudinal slit 17 extending the full length between the ears 2, and of sufficient width to accommodate the envelope therebetween but of insufficient width to enable the handle ring 12 to pass therethrough. The cover structure therefore normally encloses and protects the rolled up envelope from contact with dirt, dust and other exterior influences, prevents longitudinal movement of the spindle and possible buckling of the spring without having to use other agencies for the purpose; and by forming a stop for the ring 12 prevents a continued action of the spring after the envelope is rolled up, such as would ultimately cause the unwinding of the spring.

When the parts of the structure are once assembled and the device is attached to a dashboard, it is never necessary to detach the device or disassemble the parts, unless it is necessary to insert a new envelope therein—an operation which can be very easily carried out, as will be evident from the above description of the mounting and arrangement of the various parts. Ordinarily when it is only desired to change the certificate it is only necessary to hold the envelope out from the cover structure, remove the ring 12, and unfasten the snaps 10, when the old certificate can be removed and a new one inserted.

To inspect the certificate at any time it is only necessary to unroll the envelope from the spindle by pulling out on the handle 12, when all the reading matter on the certificate will be at once exposed through the transparent envelope. As soon as pressure on the handle is released the envelope will of itself roll back into concealed position within the cover due to the constant action of the spring.

The envelope when rolled up occupies a very small space, thereby making the device of compact form and of such a size that it may be readily mounted on any modern dash board without being in the way of any of the instruments or other mechanisms already mounted on said dashboard.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a certificate holder for a motor vehicle, a rod, means for supporting the rod, an envelope to receive a certificate, the rod passing between the opposed faces of the envelope at one end thereof, clips to engage the envelope about the rod and frictionally clamp the envelope to the rod, and means acting on the rod to rotate the same in one direction.

2. In a certificate holder for a motor vehicle, a rod, means for supporting the rod, an envelope to receive a certificate, formed by holding a sheet of material onto itself intermediate its ends, detachable fastening means for the sheet-faces down the sides thereof, and means for fastening the envelope at one end to the rod in non-turning relation therewith.

3. In a certificate holder for a motor vehicle, a rod, means for supporting the rod, an envelope to receive a certificate, formed by folding a sheet of material onto itself intermediate its ends, the rod passing between the sheet-faces at the fold thereof, and spring clips straddling and frictionally engaging the envelope portion, disposed, about the rod to maintain the rod and envelope in non-turning relationship.

4. In a certificate holder for a motor vehicle, a rod, a support for the rod including spaced ears through which the ends of the rod project, a certificate envelope adapted to be mounted on and to depend from the rod between the ears, and a hood to envelope the rod and ears and to be secured to the support; the ends of the hood extending closely against the ends of the rod to prevent longitudinal movement thereof.

In testimony whereof I affix my signature.

JOHN H. DUNCAN.